(12) United States Patent
Forster

(10) Patent No.: US 10,049,319 B2
(45) Date of Patent: Aug. 14, 2018

(54) METHOD OF ASSEMBLY USING MOVING SUBSTRATES, INCLUDING CREATING RFID INLAYS

(71) Applicant: Avery Dennison Retail Information Services, LLC, Mentor, OH (US)

(72) Inventor: Ian James Forster, Essex (GB)

(73) Assignee: AVERY DENNISON RETAIL INFORMATION SERVICES, LLC, Mentor, OH (US)

(*) Notice: Subject to any disclaimer, the term of this patent is extended or adjusted under 35 U.S.C. 154(b) by 464 days.

(21) Appl. No.: 14/572,000

(22) Filed: Dec. 16, 2014

(65) Prior Publication Data

US 2016/0172743 A1 Jun. 16, 2016

(51) Int. Cl.
 *G06K 19/077* (2006.01)

(52) U.S. Cl.
 CPC ... *G06K 19/0775* (2013.01); *G06K 19/07718* (2013.01); *Y10T 29/4913* (2015.01); *Y10T 29/49018* (2015.01)

(58) Field of Classification Search
 CPC ......... G06K 19/07718; G06K 19/0775; H05K 13/0478; Y10T 29/4913; Y10T 29/49018
 See application file for complete search history.

(56) References Cited

U.S. PATENT DOCUMENTS

| | | | |
|---|---|---|---|
| 6,107,920 A | 8/2000 | Eberhardt et al. | |
| 6,206,292 B1 | 3/2001 | Robertz et al. | |
| 6,262,692 B1 | 7/2001 | Babb | |
| 7,158,037 B2 | 1/2007 | Forster et al. | |
| 7,456,506 B2 | 11/2008 | Oberle | |
| 7,646,304 B2 | 1/2010 | Cote et al. | |
| 7,674,649 B2 | 3/2010 | Oberle | |
| 7,884,719 B2 | 2/2011 | Oberle | |
| 8,701,271 B2 | 4/2014 | Forster | |
| 2007/0183184 A1* | 8/2007 | Nakamura | H01L 24/75 365/149 |
| 2008/0129455 A1 | 6/2008 | Oberle | |
| 2009/0206474 A1 | 8/2009 | Ferguson et al. | |
| 2014/0109393 A1 | 4/2014 | Forster | |

FOREIGN PATENT DOCUMENTS

JP 2005301725 10/2005

* cited by examiner

Primary Examiner — Livius R Cazan
(74) *Attorney, Agent, or Firm* — Avery Dennison Retail Information Services, LLC

(57) ABSTRACT

A method of assembling products selects first and second planar substrates, each having a plurality of articles respectively positioned on each substrate, which articles are to be assembled together. While one of the substrates moves at a generally linear speed, the other substrate moves in a spiral fashion through an assembly location such as a nip roller to thereby match their respective speeds, resulting alignment of respective articles for assembling of the two different types of articles together from two substrates having differing pitch placement of their respective articles thereon. The non-spiraling substrate is a plurality of flights of articles in an array, and the other substrate has a block of the other articles. Typically, the number of flights corresponds to the number of articles in the block.

17 Claims, 5 Drawing Sheets

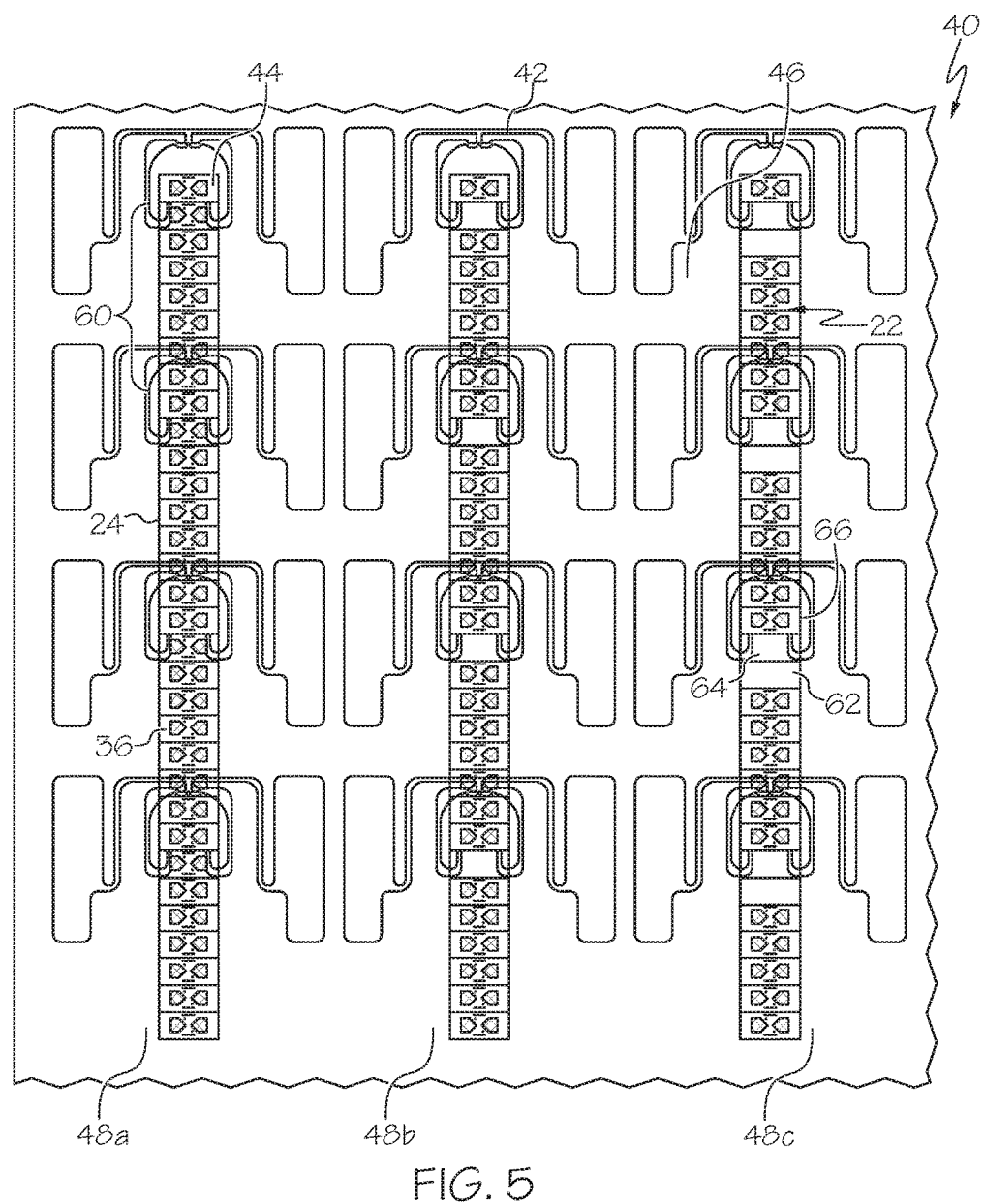

METHOD OF ASSEMBLY USING MOVING SUBSTRATES, INCLUDING CREATING RFID INLAYS

BACKGROUND

Field of the Disclosure

The present subject matter relates to assembly of components presented on separate moving webs and the resulting assemblies. This is suitable for making radio frequency identification ("RFID") devices, more particularly for assembling RFID inlays and the inlays thus assembled.

Description of Related Art

RFID tags and labels (collectively referred to herein as "devices") are widely used to associate an object with an identification code. RFID devices generally have a combination of antennae and analog and/or digital electronics, which may include, for example, communications electronics, data memory, and control logic. For example, RFID tags are used in conjunction with retail security systems, security locks in cars, for access control to buildings, and for tracking inventory and parcels. Some examples of RFID tags and labels appear in U.S. Pat. Nos. 6,107,920; 6,206,292; and 6,262,692, all of which are hereby incorporated herein by reference in their entireties.

Automatic identification of products has become commonplace. For example, the ubiquitous technology used for automatic identification products is RFID. RFID uses labels or "tags" that include electronic components that respond to radio frequency ("RC") commands and signals to provide identification of each tag wirelessly. Generally, RFID tags and labels comprise an integrated circuit ("IC", or chip) attached to an antenna that responds to a reader using radio waves to store and access the information in the chip. Specifically, RFID tags and labels have a combination of antennas and analog and/or digital electronics, which often includes communications electronics, data memory, and control logic.

One of the obstacles to more widespread adoption of RFID technology is that the cost of RFID tags and difficulties for optimization of economical manufacturing of RFID tags. Increased demand for RFID tags has manufacturers seeking cost reduction and manufacturing simplification. Also of importance is reducing the size of the electronics to: (1) increase the yield of the number of chips (dies) that may be produced from a semiconductor wafer, (2) reduce the potential for damage by providing smaller final devices, and (3) increase flexibility in deployment since reducing the amount of space needed to provide a given functionality may be used to provide more capability.

Assembly difficulties tend to increase as RFID chips and their components become smaller. For example, to interconnect the relatively small contact pads on the chips with the antennas, intermediate structures variously referred to as "straps," "interposers," and "carriers" are sometimes used to facilitate inlay manufacture. Interposers include conductive leads or pads that are electrically coupled to the contact pads of the chips for coupling to the antennas. These leads provide a larger effective electrical contact area between the chips and the antenna than do the contact pads of the chip alone. Otherwise, an antenna and a chip would have to be more precisely aligned with each other for direct placement of the chip on the antenna without the use of such strap. The larger contact area provided by the strap reduces the accuracy required for placement of the chips during manufacture while still providing effective electrical connection between the chip and the antenna. However, the accurate placement and mounting of the dies on straps and interposers still provide serious obstacles for high speed manufacturing of RFID tags and labels.

Typically the various elements that are assembled to form a complete RFID device are provided arranged on linear arrays such as on a substrate, tape or web. They then are assembled together (for example by application of heat, pressure, adhesives, solder, mechanical fasteners, any combination of the foregoing, etc.). For purposes of increasing efficiency, the pitch of these articles (i.e. spacing between them) on the substrate is typically as close as practicable. In the case of antennas and straps, however, because of their different physical size and their respective manufacturing processes as well as subsequent assembly steps for the final product, the pitch of the arrays of the antennas and of the straps on their respective substrates often is different. Thus, properly registering (i.e. matching) a strap array with an antenna array is rather difficult. Current solutions to this problem include cutting each individual strap and accelerating it to meet the respective antenna at the point of assembly, unwinding the two webs at different speeds, or displacing material web length of one web in order to draw adjacent components closer and thus reduce pitch.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an embodiment of a method of producing RFID inlays, and inlays thus produced, includes selecting a first planar substrate that is flexible and has a plurality of straps disposed in a linear array thereon with a first pitch between adjacent straps, and selecting a second planar substrate with a plurality of conductive structures for an RFID antenna disposed in an array of a plurality of linear flights thereon with a second pitch between adjacent conductive structures. Then the method routes the first planar substrate in a spiral form through an assembly location such as through a nip roller through which the second planar substrate flows at a selected linear speed, whereby the spiral action causes the first planar substrate to move at a speed that matches the selected speed of the second planar substrate and thereby aligns a first strap with a first conductive structure of a first of one of the flights, and assembling the first strap and the first conductive structure from the first flight to provide a first assembled article. Further such routing and assembling continues of respective straps and of respective conductive structures from flights of the array to provide multiple further assembled articles.

In another aspect, an embodiment of a method is provided for producing RFID inlays, and inlays thus produced, includes selecting a first planar substrate that is flexible and has a plurality of straps disposed in a linear array thereon with a first pitch between adjacent straps, and selecting a second planar substrate with a plurality of conductive structures for an RFID antenna disposed in an array of a plurality of linear flights thereon with a second pitch between adjacent conductive structures. Then the method routes the first planar substrate in a spiral form through an assembly location thereby aligning a first strap with a first conductive structure of a first of one of the flights, and assembling the first strap and the first conductive structure from the first flight to provide a first assembled article. Further such routing and assembling continues until one, more or all of respective straps and of respective conductive structures from flights of the array form multiple further assembled articles.

In a further aspect, an embodiment of a method is provided for producing RFID inlays and inlays thus produced, which includes selecting a first planar substrate that is flexible and has a plurality of straps disposed in a linear array of successive blocks thereon with a first pitch between adjacent straps, and selecting a second planar substrate with a plurality of conductive structures for an RFID antenna disposed in an array of a plurality of linear flights thereon with a second pitch between adjacent conductive structures. Then the method routes the first planar substrate in a spiral form through an assembly location thereby aligning a first strap with a first conductive structure of a first of one of the flights, and assembling the first strap and the first conductive structure from the first flight to provide a first assembled article. Further such routing and assembling continues until one, more or all of respective straps and of respective conductive structures from flights of the array form multiple further assembled articles. Each block of straps has a selected number of straps that corresponds to the number of flights in the array of the second planar substrate, whereby the further routing and assembling proceeds through all of the flights and depletes all of the straps in a given block of straps.

An added embodiment is a method provided for producing RFID inlays and inlays thus produced. This method includes selecting a first planar substrate that is flexible and has a plurality of straps disposed in a linear array thereon with a first pitch between adjacent straps, and selecting a second planar substrate with a plurality of conductive structures for an RFID antenna disposed in an array of a plurality of linear flights thereon with a second pitch between adjacent conductive structures. Then the method routes the first planar substrate in a spiral form through an assembly location having a nip roller thereby aligning a first strap with a first conductive structure of a first of one of the flights, and assembling the first strap and the first conductive structure from the first flight to provide a first assembled article. Although the first pitch and the second pitch may be different from each other (e.g. the second pitch greater than the first pitch), the first and second planar substrates move at substantially the same speed at the assembly location. Further such routing and assembling continues until one, more or all of respective straps and of respective conductive structures from flights of the array form multiple further assembled articles.

According to another aspect, an embodiment of a method and product produced thereby is provided for producing RFID inlays includes selecting a first planar substrate that is flexible and has a plurality of straps disposed in a linear array thereon with a first pitch between adjacent straps, and selecting a second planar substrate with a plurality of conductive structures for an RFID antenna disposed in an array of a plurality of linear flights thereon with a second pitch between adjacent conductive structures. Then the method routes the first planar substrate in a spiral form through an assembly location thereby aligning a first strap with a first conductive structure of a first of one of the flights, and assembling the a strap and a conductive structure while removing a strap from each of the flights to provide assembled articles. Further such routing and assembling continues until one, more or all of respective straps and of respective conductive structures from flights of the array form multiple further assembled articles.

In a further aspect, an embodiment of a method of assembly and assemblies produced thereby includes selecting a first planar substrate that is flexible and has a plurality of first articles disposed in a linear array thereon with a first pitch between adjacent straps, and selecting a second planar substrate with a plurality of second articles disposed in an array of a plurality of linear flights thereon with a second pitch between adjacent second articles. Then the method routes the first planar substrate in a spiral form through an assembly location through which the second planar substrate flows, whereby the spiral action aligns a first article with a second article of a first of one of the flights, and assembling the first article and the article from the first flight to provide a first assembled article. Further such routing and assembling continues of respective first articles and of respective second articles from flights of the array to provide multiple further assembled articles.

In another aspect, an embodiment of a method of assembly and its products are provided, which method includes selecting a first planar substrate that is flexible and has a plurality of first articles disposed in a linear array thereon with a first pitch between adjacent first articles, and selecting a second planar substrate with a plurality of second articles disposed in an array of a plurality of linear flights thereon with a second pitch between adjacent second articles. Then the method routes the first planar substrate in a spiral form through an assembly location thereby aligning a first article with a first one of the second articles of a first of one of the flights, and assembling the first article and the first of the second articles from the first flight to provide a first assembled article. Further such routing and assembling continues until one, more or all of respective first articles and of respective second articles from flights of the array form multiple further assembled articles.

In a further aspect, an embodiment of an assembly method and its products are provided, which method includes selecting a first planar substrate that is flexible and has a plurality of first articles disposed in a linear array of successive blocks thereon with a first pitch between adjacent first articles, and selecting a second planar substrate with a plurality of second articles disposed in an array of a plurality of linear flights thereon with a second pitch between adjacent conductive structures. Then the method routes the first planar substrate in a spiral form through an assembly location thereby aligning a first article with a first of the second articles of a first of one of the flights, and assembling the first article and the first one of the second articles from the first flight to provide a first assembled article. Further such routing and assembling continues until one, more or all of respective first articles and of respective second articles from flights of the array form multiple further assembled articles. Each block of first articles has a selected number of first articles that corresponds to the number of flights in the array of the second planar substrate, whereby the further routing and assembling proceeds through all of the flights and depletes all of the first articles in a given block of first articles.

An added embodiment is a method of assembling and resulting assemblies, which method includes selecting a first planar substrate that is flexible and has a plurality of first articles disposed in a linear array thereon with a first pitch between adjacent first articles, and selecting a second planar substrate with a plurality of second articles disposed in an array of a plurality of linear flights thereon with a second pitch between adjacent conductive structures. Then the method routes the first planar substrate in a spiral form through an assembly location having a nip roller thereby aligning a first article with a first one of the second articles of a first of one of the flights, and assembling the first article and the first such second article from the first flight to provide a first assembled article. Although the first pitch and the second pitch may be different from each other (e.g. the second pitch greater than the first pitch), the first and second planar substrates move at substantially the same speed at the assembly location. Further such routing and assembling continues until one, more or all of respective first articles and of respective second articles from flights of the array form multiple further assembled articles.

According to another aspect, an embodiment of a method for assembling and its resulting products are provided, which method includes selecting a first planar substrate that is flexible and has a plurality of first articles disposed in a linear array thereon with a first pitch between adjacent first articles, and selecting a second planar substrate with a plurality of second articles disposed in an array of a plurality of linear flights thereon with a second pitch between adjacent second articles. Then the method routes the first planar substrate in a spiral form through an assembly location thereby aligning a first article with a second article of one of the flights, and assembling the a first and second articles while removing a first article from each of the flights to provide assembled articles. Further such routing and assembling continues until one, more or all of respective first articles and of respective second articles from flights of the array form multiple further assembled articles.

BRIEF DESCRIPTION OF THE DRAWINGS

FIG. 5 is a diagrammatic plan view of an embodiment of a second planar substrate illustrating a pattern of removal of first articles and their assembly with respective second articles of this second planar substrate.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
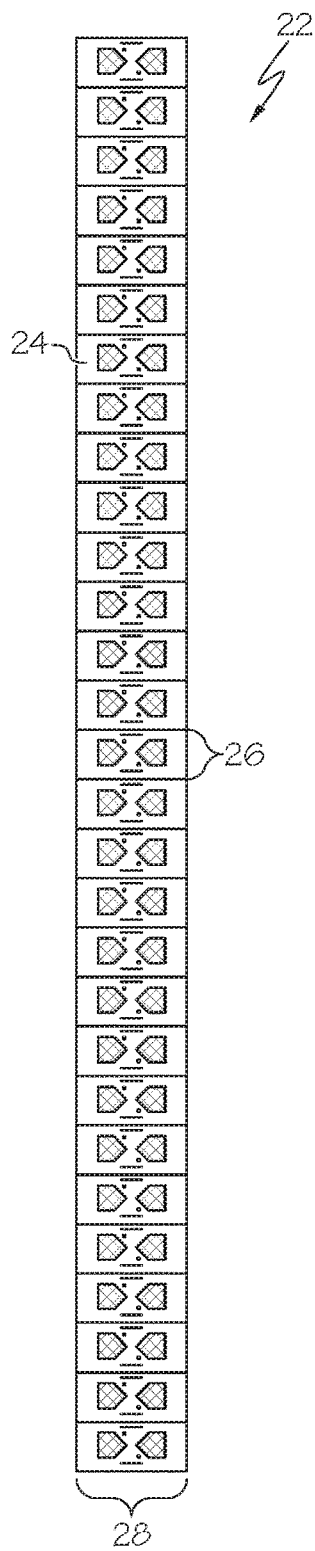
FIG. 1 is a diagrammatic plan view of an embodiment of a first planar substrate depicting a plurality of first articles releasably secured to the substrate.

A first planar substrate is generally indicated at 22 in FIG. 1. First planar substrate 22 is provided for the purpose of organizing and delivering a plurality of first articles 24. Such articles 24 are disposed in a linear array whereby the articles are spaced apart by a first spacing or pitch. In an embodiment, the first articles 24 are components of an RFID device, for example a strap, interposer or carrier. Components of this type at times are at times referenced herein as straps.

Advantageously, first articles or straps 24 are defined by a boundary width designated at 26 and a boundary length at 28 in FIG. 1. Those of ordinary skill in the art understand the concept of spacing between articles such as straps 24, this concept typically being referred to as pitch. An example of a pitch that is relatively short for RFID straps is 4.75 mm, but such a tight pitch often is not suitable for more complicated structures such as antenna components.

First planar substrate 22 is flexible to the extent that it is bendable into a spiral shape as generally discussed herein without damage and while maintaining integrity and support for the first articles or straps 24 until assembly is accomplished as discussed herein.

Figure 2:
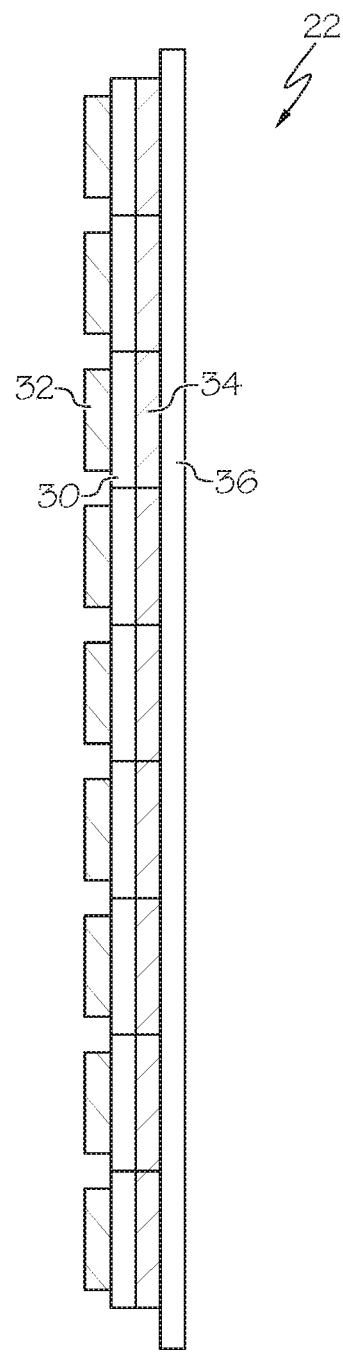
FIG. 2 is a diagrammatic side or elevation view of the first planar substrate and first articles of FIG. 1.

First planar substrate 22 is illustrated in side view in FIG. 2. Each illustrated strap includes a strap substrate 30 and a strap component 32, typically a metal strap, in the embodiment illustrated in FIG. 2. Each strap assembly 24 also has a backside adhesive layer 34, useful for the assembly procedure discussed herein in the adhesive assembly embodiment. A release liner 36 is positioned over the adhesive layer so as to maintain adhesive attributes of the adhesive layer (such as a "wet" state) and to assist in protecting same and the plurality of straps 24 that are illustrated in this embodiment. It will thus be appreciated that, with the first planar substrate embodiment of FIG. 1 and FIG. 2, a plurality of straps or strap assemblies are conveniently positioned for delivery and attachment or assembly as discussed herein. It will be appreciated that each strap or strap assembly 24 is a component separate from the other straps and positioned adjacent to each other on the release liner 36.

Figure 3:
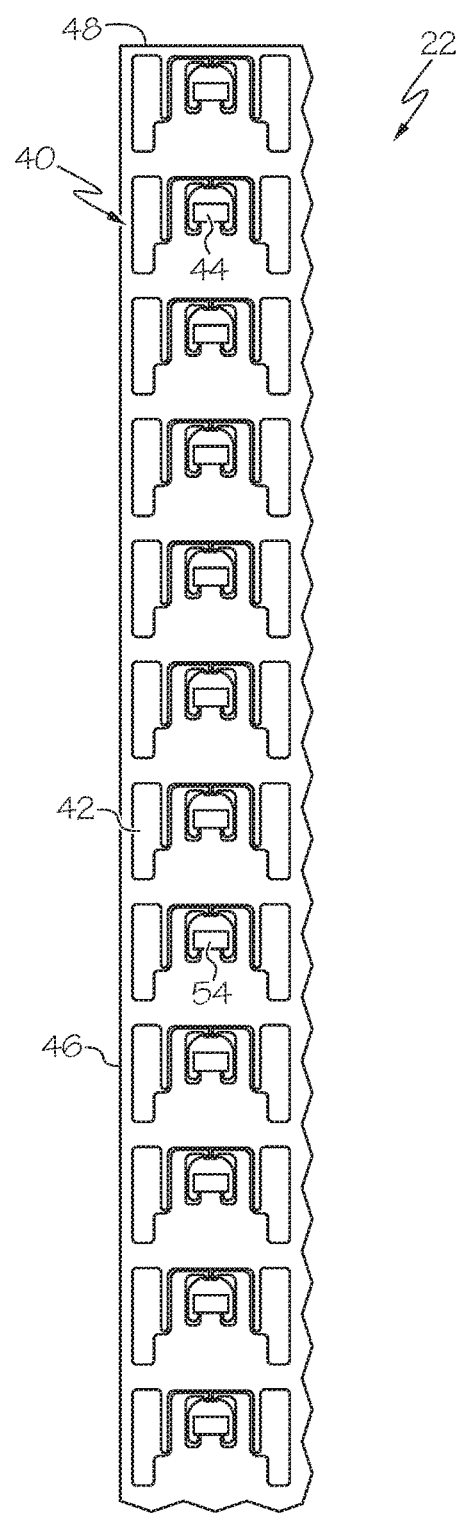
FIG. 3 is a diagrammatic plan view of an embodiment of a flight of a second planar substrate depicting a plurality of second articles.

FIG. 3 illustrates a portion of a typical second planar substrate, generally designated at 40, having a plurality of second articles 42 disposed thereon. This type of second planar substrate is particularly suitable for conductive structures for an RFID antenna, especially one of the type intended to have a strap attached thereto, such as to prepare an RFID inlay.

In an embodiment, the second planar substrate 40 takes the form of an antenna web for an RFID inlay. In such an arrangement, the second articles 42 are RFID antenna components that are conductive structures. The configuration illustrated in FIG. 3 is only exemplary of antenna components or conductive structures of the type that can be assembled in accordance with the present disclosure. Whatever the exact structure of the second articles, they typically require a larger pitch than the first articles 24. Pitches typically are required greater than 4.75 mm in order to work efficiently and to accommodate more complicated and/or delicate structures than typical first articles 24. This requirement for a larger pitch for the second articles when compared with the first articles creates a difficult challenge when assembling moving webs; for example, if the webs move at the same speed, alignment is not directly possible due to the pitch differences, requiring other features that complicate the assembly method and equipment.

Each conductive structure has located thereon at least one bond pad 44 that includes an adhesive layer that is typically printed thereonto. The adhesive of the adhesive layer can be conductive, non-conductive or a combination of conductive and non-conductive adhesive. These types of adhesives are known to one of ordinary skill in this art. The adhesive layer is external of the bond pad, thereby being accessible to assembly or attachment as discussed herein. The second articles or conductive structures 42 are presented on a base layer 46, typically made of plastic or cellulosic material. Details of web assembly and materials are generally known in the art. The grouping of second articles or conductive structures 42 is illustrated in an in-line fashion to define a linear flight 48 of second articles or conductive structures 42.

Figure 4:
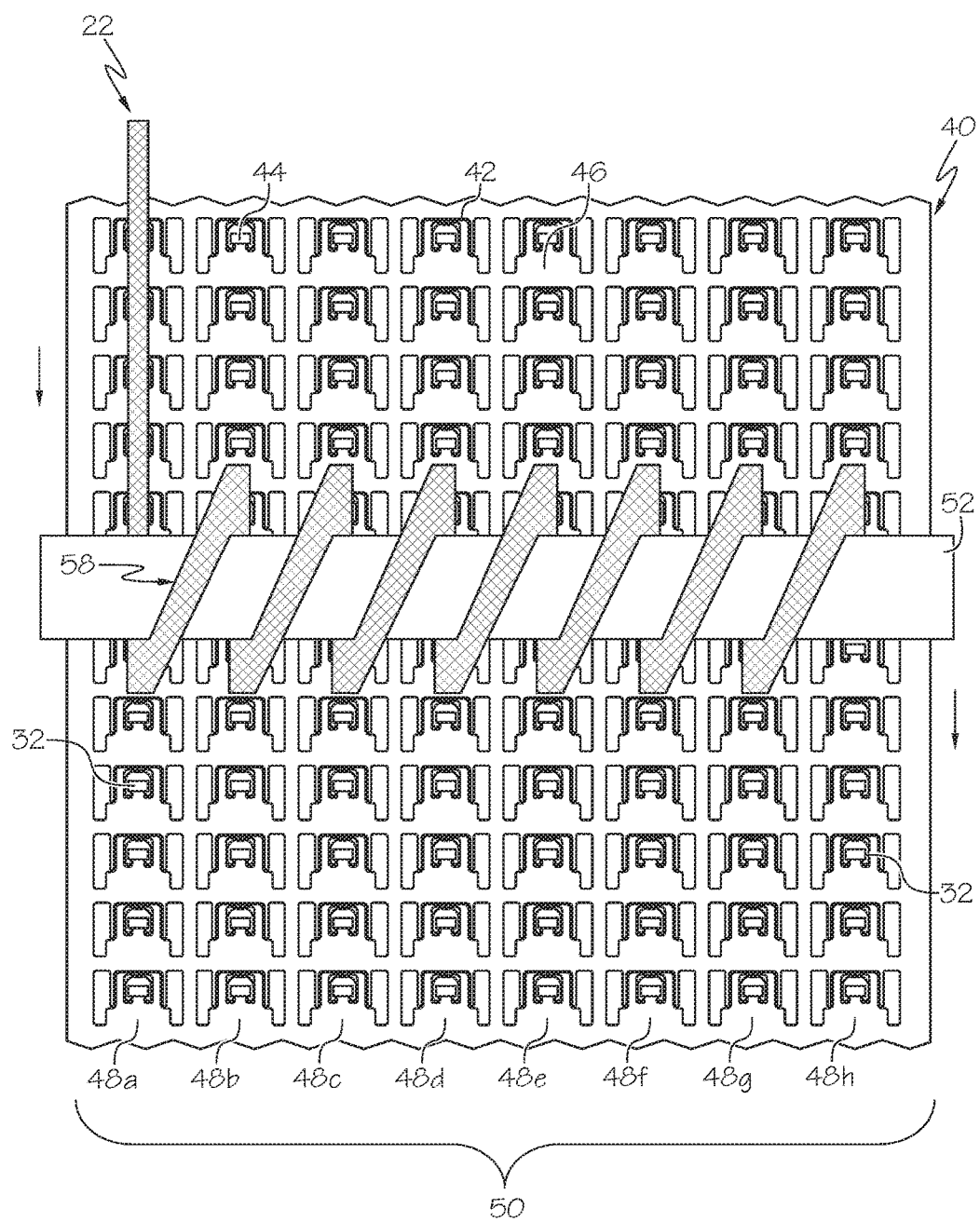
FIG. 4 is a diagrammatic plan view of an embodiment of a second planar substrate having an array of multiple parallel flights of second articles interacting with a first planar substrate having a plurality of first articles.

Turning to FIG. 4, an array, generally designated at 50, of linear flights 48 are shown as an embodiment. In FIG. 4, a length of each of eight adjoining flights is illustrated, each shown broken away as 48a, 48b, 48c, 48d, 48e, 48f, 48g and 48h. It will be appreciated that a full array 50 and its flights 48a through 48h in this embodiment extend for considerable length, typically being stored as a roll and being handled during a manufacturing process, typically including an unrolling procedure and movement to at least one assembly station prior to further handling or processing in an RFID manufacturing procedure.

FIG. 4 further shows an assembly location 52, which can take the form of a nip roller or a nip roller station. Assembly location 52 achieves a bringing together of the first planar substrate 22 and the second planar substrate or array 50 into close proximity to each other, achieving proper alignment as discussed herein. The alignment and positioning are such that a strap 32 from the first planar substrate 22 moves close enough to a bond pad 44 of a second article or RFID conductive structure 42 whereby the first article strap 32 combines with the second article. In a typical embodiment, the strap 32 separates from strap substrate 30 (FIG. 2) and, provided proper alignment is maintained, attaches to the second article, typically its bond pad 44, thereby combining to form an RFID inlay according to an embodiment.

In an embodiment, this combination of respective components from the first planar substrate and from the second planar substrate is facilitated by printing or otherwise applying an adhesive to the outside surface of the bond pad 44. Such an adhesive layer is schematically illustrated at 54 on a bond pad 44 in FIG. 3. This adhesive 54 can be conductive, non-conductive or a combination of conductive and non-conductive adhesive. FIG. 4 illustrates an embodiment wherein a strap 32 is secured onto and over a bond pad 42 of each second article, thereby forming the combined article 56 or RFID inlay where a plurality of such combined articles or inlays 56 are seen downstream of the assembly location 52.

As generally illustrated in FIG. 4, the second planar substrate 40 supporting the second articles or RFID conductive structures 42 moves in a direction downwardly as seen in FIG. 4, generally shown by arrows in FIG. 4. In a preferred but not necessarily essential embodiment, the second planar substrate 40 and thus the entirety of the array 50 of linear flights 48 move at a substantially constant velocity. Meanwhile, the first planar substrate or strap web 22 moves through the assembly location along a spiral path, generally designated at 58. This spiral path is sized and configured such that its velocity at the location at which the straps 32 and bond pads 44 combine is the same as that of the second planar substrate 40 despite any difference in pitch between the articles of the first planar substrate and the articles of the second planar substrate.

Using the embodiment of straps on a strap web and RFID antennas having bond pads and being positioned on an antenna web as an example of the disclosure, same is provided to illustrate the method and system of the disclosure. Strap web 22 is fed in at the first position, corresponding to linear flight 48a. The nip roller 52 causes one in every eight of the straps of this first flight 48a to be transferred to an antenna component 42 on this first flight while same is moving. The transfer is achieved by action of the nip roller to bring a strap 32 into close proximity to the adhesive layer 54 on an antenna 42 of the moving first flight. Other straps of the strap web may contact the antenna web 40, but not in the position of alignment with a bond pad 44 and its adhesive layer 54; these straps do not transfer.

The strap web 22 next is fed to, spiraled over or looped over to the second position or flight by operation of the nip roller and its associated mechanisms and action, which corresponds to flight 48b. In this illustrated embodiment, the length of the pad of the strap web 22 is such that the strap 32 that is transferred to the antenna adhesive pad 44 is adjacent to the strap that had been removed in the first position, flight 48a in FIG. 4.

Continuing with the process, the strap web 22 is again looped over in generally spiral fashion to the third position, which is flight 48c in FIG. 4, with an appropriate length to thereby remove the third strap in a block of eight straps in this embodiment. This action carries on across the array 50 until all of the flights have been in contact with a strap of the web 22, whereupon the block of eight consecutive straps 32 is depleted by having been received by a bond pad 44 from each of the flights 48a through 48h. With this approach, including the spiral action of the strap web 22, the strap web speed and the antenna web speed are matched at the location of alignment and/or contact between each strap 32 and each antenna bond pad 44. This is achieved despite a difference in pitch between the strap web 22 and the antenna web 40 in this embodiment.

A further illustration of the embodiment by which a block of straps (or other first articles) is removed across all flights of the antenna web array is illustrated in FIG. 5. In this illustrated embodiment, eight consecutive straps 24 of the strap web 22 form a strap block 60. It will be appreciated that a typical strap web has a multitude of these strap blocks 60 in end-to-end relationship. Also, eight flights 48a through 48h and eight straps 24 of a block 60 are illustrative, fewer or more than eight being possible dependent upon the particular needs and objectives of the assembly approach, method and system. In most embodiments, the number of members or first articles 24 comprising a block 60 corresponds to the number of flights chosen in the array of antenna components, conductive structures or second articles 42, and the first articles meet the second articles while each is moving at the same speed to insure proper alignment and assembly.

Referring more particularly to FIG. 5, in the first lane (flight 48a in this illustration) one antenna component (second article) 42 takes, or receives, a first strap (first article 24) of block 60, this first article being lifted off of the release liner 36 under the block. In the second lane (flight 48b in this illustration), the length having been adjusted by the spiraling operation, an antenna component (second article 42) of this flight takes the next adjacent or second strap (first article) of that same block 60. Then, in the third lane (flight 48c in this illustration) the next antenna component (second article) of this flight takes the next adjacent or third strap (first article) of that same block 60, aligned according to the spiraling operation. Thereafter, in the fourth lane (flight 48d in FIG. 4) the next antenna component (second article) of this flight takes the next adjacent or fourth strap (first article) of that same block 60, followed by the fifth lane (flight 48e) next antenna component (second article) taking the next adjacent or fifth strap (first article) of that same block 60, the sixth lane (flight 48f) next antenna component (second article) taking the next adjacent or sixth strap (first article) of that same block 60, the seventh lane (flight 48g) next antenna component (second article) taking the next adjacent or seventh strap (first article) of that same block 60, and the eighth lane (flight 48h) next antenna component (second article) taking the next adjacent or eighth strap (first article) of that same block 60. This operation continues progressively across the entire array of the antenna web, including all of its flights, until all of the straps 24 have been exhausted from that strap web (first planar substrate) or until the desired number of assemblies have been performed.

With further particular reference to FIG. 5, removal of the first strap exposes a first location of the release liner 36. Removal of a second strap along the second flight, 48b in this illustration, exposes a second location 64 of the release liner, while removal of a strap from the third flight, 48c in this illustration, exposes a third location 66, which is hidden in FIG. 5 under a bond pad 44. As this assembly action progresses through all eight of the flights in this illustrated embodiment, a total of eight such locations are exposed, thereby depleting the block of straps 60. This action proceeds simultaneously for multiple blocks 60 along all of the flights of the array 50, after which all straps 24 intended for assembly during a given manufacturing have been removed and assembled to the antenna.

From the above, it will be understood that this mechanism and system allows for flexible manufacture of RFID inlays or similar assembled components, from a base stock of "wet" straps and antennas with an adhesive area over the bond pads. A wet system often includes adhesives to achieve easy and prompt adherence using systems such as pressure-sensitive adhesives or other materials exhibiting properties such as tack or heat, light and/or actinic radiation responsiveness in order to achieve the desired adherence of the strap to the structure such as an RFID antenna or antenna component.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An assembly method, comprising:
   selecting a first planar substrate that is flexible and has a plurality of first articles disposed in a linear array thereon with a first spacing between adjacent first articles;
   selecting a second planar substrate with a plurality of second articles disposed in an array of a plurality of linear flights thereon with a second spacing between adjacent second articles;
   routing the first planar substrate in a spiral form through an assembly location thereby aligning a first one of the first articles with a first one of the second articles on a first of one of the flights;
   assembling the first one of the first articles and the first one of the second articles from the first flight to provide a first assembled article;
   continued routing of the first planar substrate in a spiral form through the assembly location thereby aligning a second one of the first articles with a first one of the second articles of a second one of the flights;
   assembling the second one of the first articles and the first one of the second articles of the second flight to provide a second assembled article; and
   continued further routing and further assembling of first articles and of second articles from flights of the array to provide multiple further assembled articles.

2. The method in accordance with claim 1, wherein the first and second ones of the first articles are adjacent each other along the first planar substrate and combine to form a block of first articles in a linear grouping.

3. The method in accordance with claim 1, wherein the second spacing is greater than the first spacing.

4. The method in accordance with claim 1, wherein the first and second planar substrates move at the same speed at the assembly location.

5. The method in accordance with claim 1, wherein the first articles are disposed on the first planar substrate in successive blocks having a selected number of first articles that corresponds to the number of flights in the array of the second planar substrate, and wherein the continued further routing and assembling proceeds through all of the flights whereupon all of the first articles in at least one of the blocks are assembled to second articles, one second article from each flight.

6. The method in accordance with claim 1, wherein the routing assembly location includes a nip roller and the first and second planar substrates move at the same speed through the nip roller.

7. The method in accordance with claim 1, wherein the assembly location includes a nip roller and wherein the first planar substrate is routed in a spiral form across the nip roller and the second planar substrate moves linearly at a selected speed, whereby the first planar substrate moves at a speed that matches the selected speed of the second planar substrate and whereby spacing conversion is achieved such that difference in spacing between the first and second planar substrates is accommodated to achieve accurate assembly of respective first and second articles.

8. A method of producing RFID inlays, comprising:
   selecting a first planar substrate that is flexible and has a plurality of straps disposed in a linear array thereon with a first pitch between adjacent straps;
   selecting a second planar substrate with a plurality of conductive structures for an RFID antenna disposed in an array of a plurality of linear flights thereon with a second pitch between adjacent conductive structures;
   routing the first planar substrate in a spiral form through an assembly location thereby aligning a first strap with a first conductive structure of a first one of the flights;
   assembling the first strap and the first conductive structure from the first flight to provide a first assembled RFID inlay;
   continued routing of the first planar substrate in a spiral form through the assembly location thereby aligning a second strap with a first conductive structure of a second one of the flights;
   assembling the second strap and the first conductive structure of the second flight to provide a second assembled RFID inlay; and
   continued further routing and further assembling of respective straps and of respective conductive structures from flights of the array to provide multiple further assembled RFID inlays.

9. The method in accordance with claim 8, wherein the first and second straps are adjacent each other along the first planar substrate and combine to form a block of straps in a linear grouping.

10. The method in accordance with claim 8, wherein the second pitch is greater than the first pitch.

11. The method in accordance with claim 8, wherein the first and second planar substrates move at the same speed at the assembly location.

12. The method in accordance with claim 8, wherein the straps are disposed on the first planar substrate in successive blocks having a selected number of straps that corresponds to the number of flights in the array of the second planar substrate, and wherein the continued further routing and assembling proceeds through all of the flights whereupon all of the straps in at least one of the blocks are assembled to conductive structures from each flight.

13. The method in accordance with claim 8, wherein the routing assembly location includes a nip roller and the first and second planar substrates move at the same speed through the nip roller.

14. The method in accordance with claim 8, wherein the assembly location includes a nip roller and wherein the first planar substrate is routed in a spiral form across the nip roller and the second planar substrate moves at a selected linear speed, whereby the first planar substrate moves at a speed that matches the selected speed of the second planar substrate and whereby pitch conversion is achieved such that difference in pitch between the first and second planar substrates is accommodated to achieve accurate assembly of respective straps and conductive structures.

15. The method in accordance with claim 8, wherein the straps are disposed on the first planar substrate in successive blocks having a selected number of straps that corresponds to the number of flights in the array of the second planar substrate, and wherein the continued further routing and assembling proceeds through all of the flights whereupon all of the straps in at least one of the blocks are assembled to conductive structures from each flight.

16. A method of producing RFID assemblies, comprising:
selecting a first planar substrate that is flexible and has a plurality of straps having a narrow footprint disposed in a linear array thereon with a first narrow pitch between adjacent straps;
selecting a second planar substrate with a plurality of RFID conductive structures disposed in an array of a plurality of linear flights thereon with a second pitch between adjacent conductive structures, the conductive structures having a footprint size greater than the footprint size of the straps, and the conductive structures having a second pitch greater than the first pitch to accommodate the greater footprint size of the conductive structures, the second planar substrate moving at a selected speed;
routing the first planar substrate in a spiral form through an assembly location along which the second planar substrate moves, thereby aligning a first strap with a first conductive structure of a first one of the flights;
assembling the first strap and the first conductive structure from the first flight to provide a first RFID assembly; and
continued routing of the first planar substrate in a spiral form through the assembly location thereby aligning respective straps with respective conductive structures of subsequent ones of the flights, and continued assembling of the respective straps onto the respective conductive structures thereby providing a plurality of the RFID assemblies.

17. The method in accordance with claim 16, wherein the assembly location includes a nip roller and wherein the first planar substrate is routed in a spiral form across the nip roller, whereby the first planar substrate moves at a speed that matches the selected speed of the second planar substrate and whereby pitch conversion is achieved such that difference in pitch between the first and second planar substrates is accommodated to achieve accurate assembly of respective straps and conductive structures.

* * * * *